Dec. 27, 1927.
C. S. HALL
1,653,903
AIRCRAFT WING
Filed March 25, 1924      2 Sheets-Sheet 1
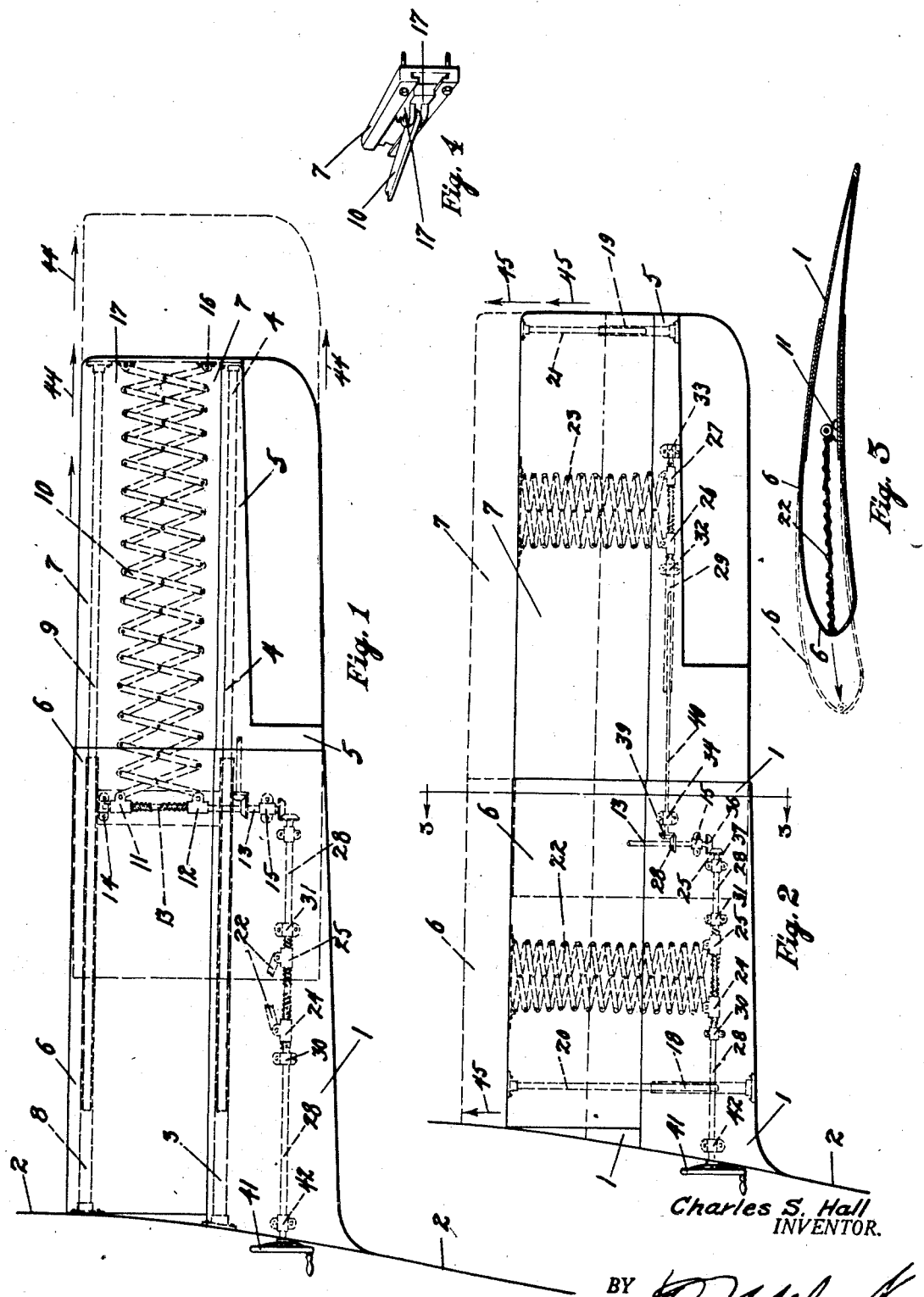
Charles S. Hall
INVENTOR.
BY
ATTORNEY.

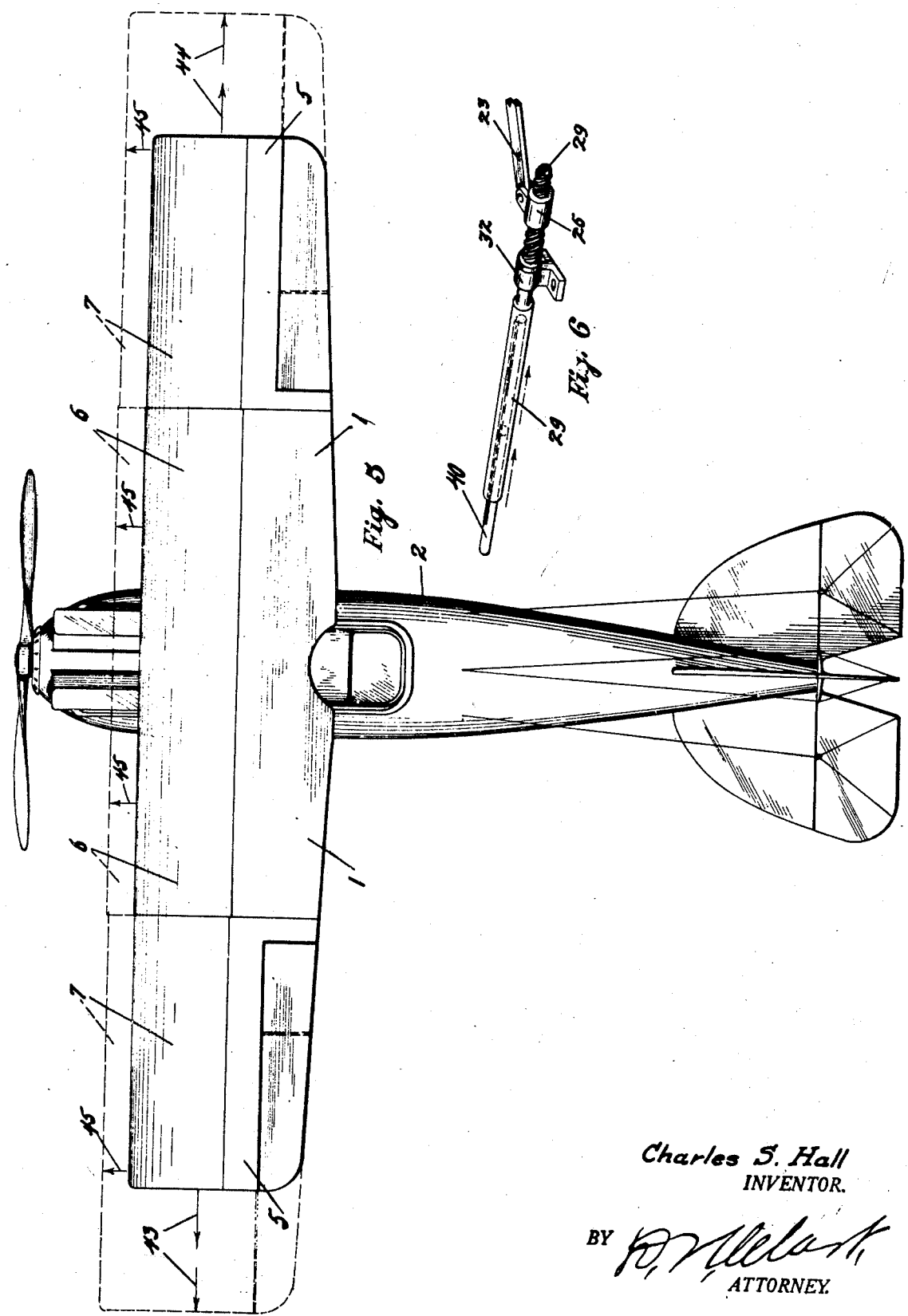

Patented Dec. 27, 1927.

1,653,903

UNITED STATES PATENT OFFICE.

CHARLES S. HALL, OF LOS ANGELES, CALIFORNIA, ASSIGNOR TO HALL AIRWAYS CORPORATION, OF DOVER, DELAWARE, A CORPORATION.

AIRCRAFT WING.

Application filed March 25, 1924. Serial No. 701,734.

My invention relates to an improvement in aircraft wings and has for one of its objects to provide a supporting wing the area of which may be enlarged or diminished as may be required in proportion to the velocity through the air, the load or the altitude.

Another object is to so construct the device that the aliformity thereof may be maintained at any stage during the varying of the areas.

Another object is to provide a means of enlarging or decreasing both the longitudinal and transverse dimensions of the wing.

To maintain aliformity of the wing surfaces and to provide a means of varying the areas, both longitudinally and transversely, is of greatest importance to the successful and safe operation of aircraft, since by so doing slow landings can be made, as well as correspondingly slow takeoffs can be made, all of which increase the factors of safety of operation in proportion to the speed and momentum involved in all ground speeds, while in flight, as the forward velocity is increased the wing surfaces may be commensurately decreased so as to secure a constant lifting effect proportioned only by the load in all altitudes. By so constructing the wing as shown in my device less power will be required from the engine for propulsion at high velocity and inversely and concomitantly high speeds may be attained economically, with less skin friction due to less areas exposed, all of which increases the desirability of aircraft for military, civil and commercial purposes since time will be reduced economically between given points of travel and, also, since less engine power is required less expense will be occasioned by the operation thereof, as well as less cost will be involved in the construction and operation of the engine, as can be readily understood. To supply this want the present evolvement is made.

Having thus disclosed the principal objects of the present invention, and while other objects may be apparent from the reading of this specification and of the claims, I will now describe the invention with reference to the accompanying drawings which form an essential part, though an illustration of, the invention as disclosed in this specification.

Figure 1 is a plan view, of the wing with the internal mechanism, relating to the means of longitudinal variations, shown in dotted lines.

Figure 2 is the same view with the internal mechanism, relating to the means of transverse variations, shown in dotted lines.

Figure 3 is a cross-sectional view of the wing taken on line 3—3 shown in Figure 2, looking in the direction indicated by the arrows.

Figure 4 is an enlarged perspective detailed view of the sliding brace member arranged at the forward or outer ends of the "lazy tongs".

Figure 5 is a plan view of the aircraft showing in dotted lines the areas of the wing surfaces when increased.

Figure 6 is an enlarged perspective detailed view of the shaft and sleeve of the mechanism relating to the outward transverse "lazy tongs" shown in Figure 2.

In carrying out my invention, wing base 1, is attached to body 2 of the aircraft as illustrated in Figures 1, 2 and 5. Within wing base 1 a longitudinal supporting sleeve member 3 is arranged as shown by dotted lines in Figure 1, within which tube 4 is slidably arranged to support the sliding wing base 5 as shown in Figures 1 and 2. Telescoping wing base 6 is arranged over wing base 1 as shown in Figures 1, 2, 3 and 5, while in sliding wing base 5 the telescoping sliding wing portion 7, shown in Figures 1, 2 and 5 is arranged. The said telescoping wing base 6 is carried by supporting sleeve member 8, shown in Figure 1, while the telescoping portion of sliding wing 7 is held upon tube 9, also shown in Figure 1. Longitudinal "lazy tongs" 10, shown in Figure 1, is attached to supporting members 11 and 12, the said members being threaded to engage right-hand and left-hand threads on shaft 13 carried on journals 14 and 15, as shown in Figure 1, while the outward end of the said "lazy tongs" is attached to the telescoping portion of sliding wing 7 by means of bracket and pivot 16, while the opposite and forward member of the "lazy tongs" is attached to bracket and pivot 17 held upon the telescoping portion 7, shown in Figure 1 as detailed, and shown in enlarged view in Figure 4.

Sliding wing base 6 and telescoping portion 7 are supported transversely by sleeves 18 and 19 respectively, arranged in wing base 1 and sliding wing base 5, as illustrated in Figure 2, within which rods 20 and 21 respectively, arranged upon telescoping base 6 and sliding wing portion 7 as shown in Figure 2, while the transverse "lazy tongs" 22 and 23 are held in their respective threaded members 24 and 25, and 26 and 27, respectively, as can be readily seen and substantially as described with reference to the longitudinal "lazy tongs" 10 with reference to sliding bracket 17, as illustrated in Figure 4.

Supports 24, 25, 26 and 27 are arranged upon opposed threaded portions of shafts 28 and 29 held by journals 30, 31, 32, 33, 34 and 35, all shown in Figure 2 and in part in Figure 1.

Shaft 13 is rotated by bevel gear 36 attached thereto engaging bevel gear 37 attached to shaft 28, while gear 38 on shaft 13 engages gear 39 on shaft 40, as shown in Figure 2. Shaft 40 is slidably arranged in shaft 29, as shown in Figure 2, and as shown in enlarged detailed view in Figure 6.

Control wheel 41 is attached to shaft 28 and supported therewith by journal 42, as shown in Figures 1 and 2.

Thus it will be seen that by turning control wheel 41 revolving shaft 28 in journals 42, 30, 31 and 35, the said shaft 28 carrying right-hand and left-hand threaded portions engaging supporting members 24 and 25 of the "lazy tongs" 22, that the said supporting members 24 and 25 will be moved towards or from each other as wheel 41 is rotated right-handedly or left-handedly, as can be readily understood. It will be further seen that simultaneously with the rotation of shaft 28 through gears 37 and 36, shaft 13 will be rotated and through gears 38 and 39, shaft 40 arranged within sliding shaft 29 will move "lazy tongs" 10 in a longitudinal direction and "lazy tongs" 23 in a transverse direction, respectively, as can be readily understood. Thus the wing areas may be enlarged or diminished simultaneously as indicated by arrows 44 and 45, as shown in Figures 1, 2 and 5.

Of course it will be understood that various changes may be made in the adaptation, association, arrangements and collocations of parts as well as in their means of control without departing from the spirit of this invention.

Having thus described my invention in its preferred form, as shown and illustrated, what I claim and for which I desire to secure Letters Patent are as follows:

1. In an aircraft wing, the combination of: a fixed wing section; a sliding wing section; a telescoping wing section arranged over the said fixed wing section; a telescoping wing section arranged over the said sliding wing section; a manually operated mechanism mounted within the fixed wing section and in the sliding wing section, forming means of simultaneously enlarging the wing surfaces.

2. In an aircraft wing, the combination of: a fixed wing base; a sliding wing, a telescoping wing arranged over the said fixed wing base and over the sliding wing portion and a "lazy tongs" operatively mounted within the said fixed wing and manually controlled for moving the sliding and telescoping wings.

3. In an aircraft wing, the combination of a base member, a telescoping member operatively mounted over the said base member, a sliding wing member operatively mounted within the said base member, a telescoping member operatively mounted over the sliding member, and means arranged within the said base member and the said sliding member and operatively associated with the said telescopic members for moving the telescoping members transversely and for simultaneously moving the sliding member longitudinally of the said wing.

4. In an aircraft wing, the combination of a base, a sliding portion arranged within the said base and movable parallel to the longitudinal center of the said base, a telescoping portion forwardly disposed and movable transversely of the longitudinal center of the said base, a telescoping portion arranged over the sliding portion, the said telescoping portion being movable transversely of the longitudinal center of the said base and a manually controlled mechanism arranged to actuate simultaneously the telescoping and sliding portions of the said wing.

In testimony whereof I have signed this specification.

CHARLES S. HALL.